(12) United States Patent
Liao et al.

(10) Patent No.: US 11,187,841 B2
(45) Date of Patent: Nov. 30, 2021

(54) LIGHT GUIDE PLATE AND LIGHT SOURCE MODULE

(71) Applicant: CHAMP VISION DISPLAY INC., Miaoli County (TW)

(72) Inventors: Chun-Chien Liao, Miao-Li County (TW); Hsin-Hung Lee, Miao-Li County (TW); Chin-Ku Liu, Miao-Li County (TW)

(73) Assignee: CHAMP VISION DISPLAY INC., Miaoli County (TW)

( * ) Notice: Subject to any disclaimer, the term of this patent is extended or adjusted under 35 U.S.C. 154(b) by 51 days.

(21) Appl. No.: 16/746,979

(22) Filed: Jan. 20, 2020

(65) Prior Publication Data

US 2020/0233142 A1 Jul. 23, 2020

(30) Foreign Application Priority Data

Jan. 23, 2019 (CN) .......................... 201910061927.9

(51) Int. Cl.
  *F21V 8/00* (2006.01)
(52) U.S. Cl.
  CPC ......... *G02B 6/0036* (2013.01); *G02B 6/0068* (2013.01); *G02B 6/0088* (2013.01); *G02B 6/0091* (2013.01)
(58) Field of Classification Search
  CPC .. G02B 6/0068; G02B 6/0036; G02B 6/0088; G02B 6/0091; G02B 6/006; G02B 6/0038; F21K 9/61; F21K 9/68
  See application file for complete search history.

(56) References Cited

U.S. PATENT DOCUMENTS

| | | | | |
|---|---|---|---|---|
| 2014/0198524 A1* | 7/2014 | Tseng | ................... | G02B 6/0038 362/607 |
| 2015/0268404 A1* | 9/2015 | Chiu | ................... | G02B 6/0073 362/606 |

FOREIGN PATENT DOCUMENTS

| | | |
|---|---|---|
| CN | 1627104 | 6/2005 |
| CN | 100381914 | 4/2008 |
| CN | 101449309 | 6/2009 |
| CN | 102681083 | 9/2012 |
| CN | 104864362 | 8/2015 |
| CN | 105913783 | 8/2016 |
| CN | 106663398 | 5/2017 |
| JP | 2006075362 | 3/2006 |

(Continued)

*Primary Examiner* — Andrew J Coughlin
*Assistant Examiner* — Jessica M Apenteng
(74) *Attorney, Agent, or Firm* — JCIPRNET (57) ABSTRACT

A light guide plate (LGP) and a light source module are provided. The LGP includes a plate body, first microstructures and second microstructures. The plate body has a first light incident surface, a second light incident surface adjacent to the first light incident surface and a first surface connected thereto. The first microstructures are located on the first surface, and each has a first optical surface facing the first light incident surface. Two sides of each first microstructure respectively have a first edge portion. One of the first edge portions faces and is inclined relative to the second light incident surface, and there is a first included angle between the first edge portion facing the second light incident surface and the first surface. The second microstructures are located on the first surface, and each second microstructure has a second optical surface facing the second light incident surface.

20 Claims, 10 Drawing Sheets

(56) References Cited

FOREIGN PATENT DOCUMENTS

| TW | 201614290 | 4/2016 |
| TW | 201618062 | 5/2016 |
| TW | I574061 | 3/2017 |

* cited by examiner

LIGHT GUIDE PLATE AND LIGHT SOURCE MODULE

CROSS-REFERENCE TO RELATED APPLICATION

This application claims the priority benefit of China application serial no. 201910061927.9, filed on Jan. 23, 2019. The entirety of the above-mentioned patent application is hereby incorporated by reference herein and made a part of this specification.

BACKGROUND

Technical Field

The invention relates to a light guide plate and a light source module, and particularly relates to a light guide plate having a plurality of microstructures and a light source module using the same.

Description of Related Art

At present, light source modules are mainly divided into edge back-lit light source modules and direct back-lit light source modules. The edge back-lit light source module uses a Light Guide Plate (LGP) to guide light emitted by a light source disposed at a light incident side of the LGP to a light emitting surface of the LGP, so as to form a planar light source. Generally, optical microstructures used for displaying a specific pattern may be formed on a surface of the LGP, so as to provide an illumination device having a pattern lighting effect.

Generally, in order to present a double-pattern lighting effect in the illumination device, a known method is to configure multiple microstructures on the surface of the LGP to respectively extend along horizontal and vertical directions for corresponding to the light sources emitting light in the vertical and horizontal directions respectively, and then use a light source switch to present the corresponding pattern individually. To be more specific, if the microstructures extending along the horizontal direction are used for presenting a pattern A, when the corresponding light source emitting the light in the vertical direction is turned on, the illumination device may present the pattern A. If the microstructures extending along the vertical direction are used for presenting a pattern B, when the corresponding light source emitting the light in the horizontal direction is turned on, the illumination device may present the pattern B. However, in fact, when the pattern A is to be displayed, once the light source emitting light in the vertical direction is turned on, a part of the light is still reflected to human eyes through optical surfaces of the microstructures used for presenting the pattern B, which causes a crosstalk phenomenon that the pattern B is vaguely visible.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a light guide plate, which is adapted to reduce a crosstalk phenomenon between different optical patterns.

The invention is directed to a light source module, which is capable of clearly switch and display different optical patterns.

Other objects and advantages of the invention may be further illustrated by the technical features broadly embodied and described as follows.

In order to achieve one or a portion of or all of the objects or other objects, an embodiment of the invention provides a light guide plate. The light guide plate includes a plate body, a plurality of first microstructures and a plurality of second microstructures. The plate body has a first light incident surface, a second light incident surface and a first surface, wherein the first light incident surface is adjacent to the second light incident surface, and the first surface connects the first light incident surface and the second light incident surface. The plurality of first microstructures are located on the first surface, wherein each of the first microstructures has a first optical surface, and the first optical surface faces the first light incident surface, and two sides of each of the first microstructures respectively have a first edge portion, one of the first edge portions faces the second light incident surface and is inclined relative to the second light incident surface, and there is a first included angle between the first edge portion facing the second light incident surface and the first surface. The plurality of second microstructures are located on the first surface, wherein each of the second microstructures has a second optical surface, and the second optical surface faces the second light incident surface.

In order to achieve one or a portion of or all of the objects or other objects, an embodiment of the invention provides a light source module. The light source module includes the aforementioned light guide plate, a first light source and a second light source. The first light source is located beside the first light incident surface of the light guide plate, wherein the first light source is configured to provide a first light beam, and the first light beam enters the light guide plate through the first light incident surface. The second light source is located beside the second light incident surface of the light guide plate, wherein the second light source is configured to provide a second light beam, and the second light beam enters the light guide plate through the second light incident surface.

Based on the above description, the embodiments of the invention have at least one of following advantages or effect. In the embodiment of the invention, the light source module and the light guide plate of the invention are adapted to deviate the light that is not applied to the main optical surface used for presenting a pattern effect from a viewing angle of a viewer based on the configuration of the first edge portions of the first microstructures, so as to reduce the crosstalk phenomenon of different optical patterns. In this way, the light source module of the invention is capable of clearly switching and displaying different optical patterns.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5B to FIG. 6B are side views of different first microstructures or second microstructures of FIG. 4.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
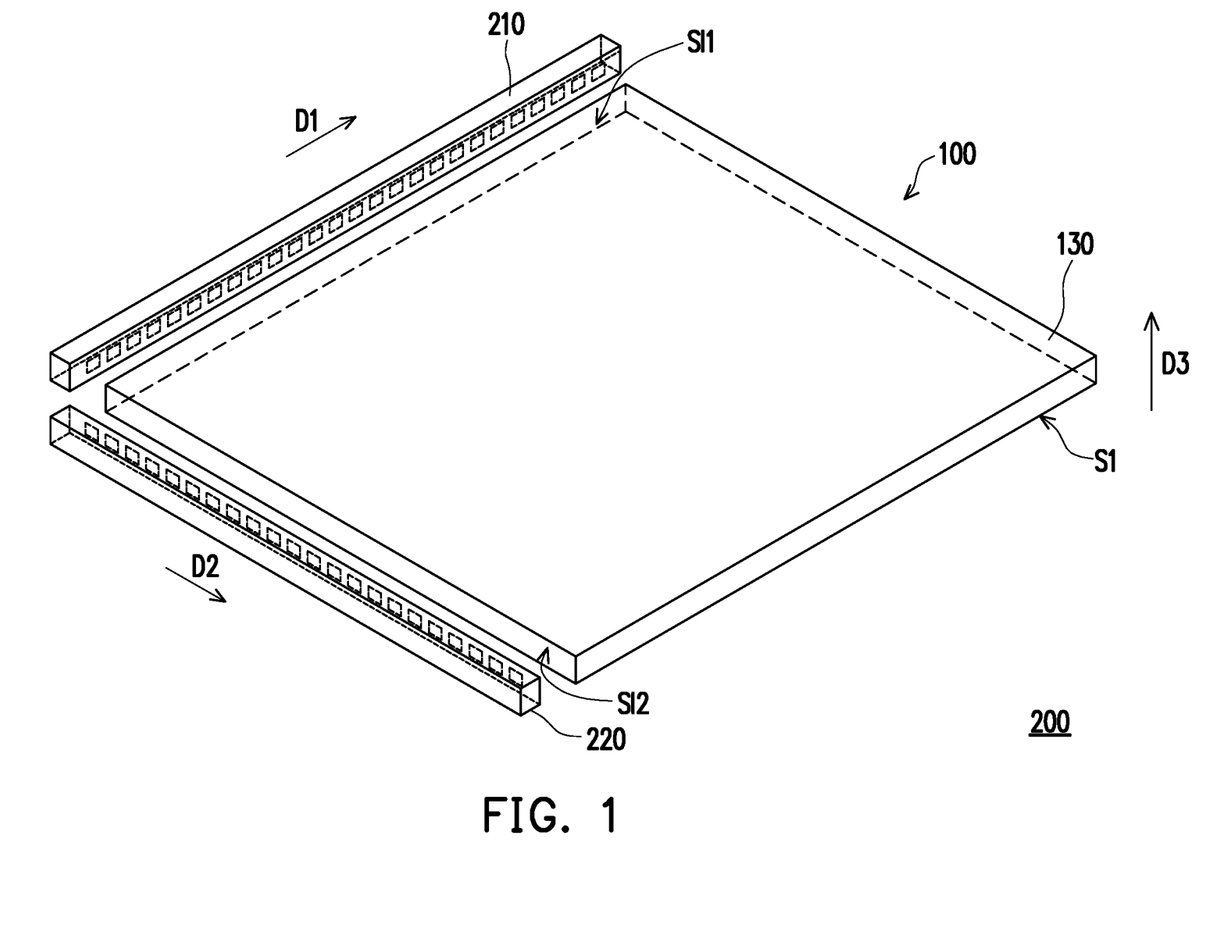
FIG. 1 is a schematic diagram of a framework of a light source module according to an embodiment of the invention.
Figure 2:
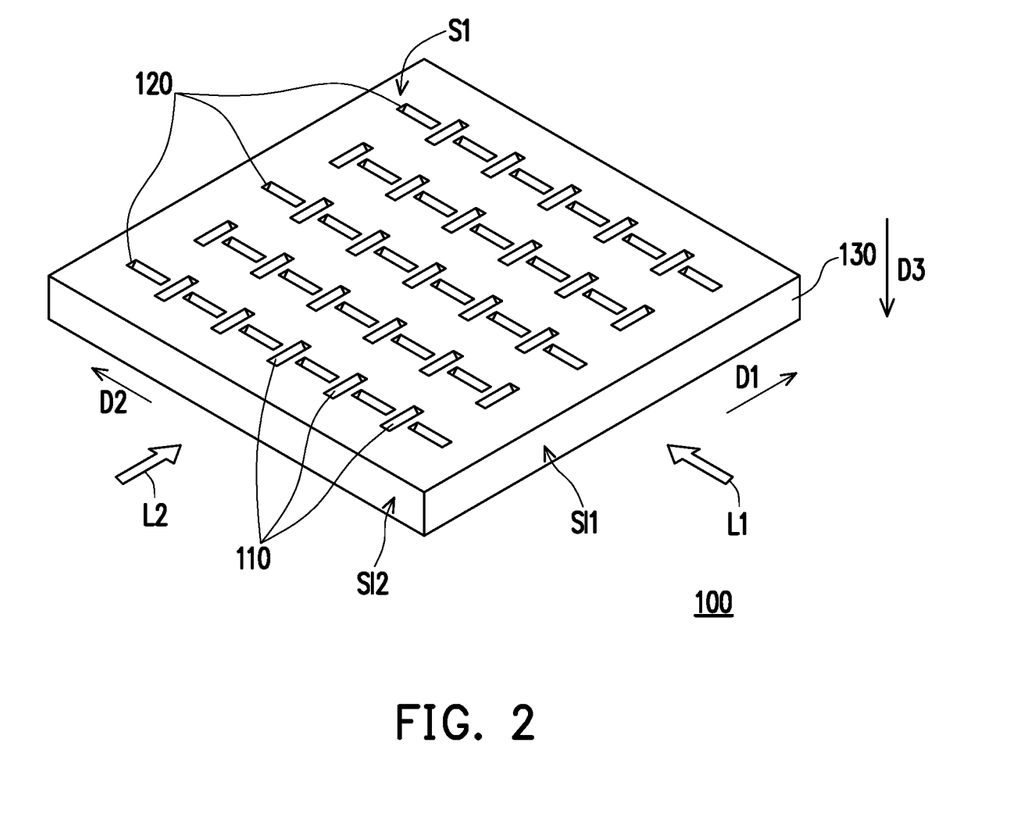
FIG. 2 is a bottom view of a light guide plate of FIG. 1.

FIG. 1 is a schematic diagram of a framework of a light source module according to an embodiment of the invention. FIG. 2 is a bottom view of a light guide plate of FIG. 1. Referring to FIG. 1 and FIG. 2, the light source module 200 of the embodiment includes a light guide plate 100, a first light source 210 and a second light source 220. For example, in the embodiment, the first light source 210 and the second light source 220 may be light bars including a plurality of Light Emitting Diode (LED) elements or other types of light emitting elements used for providing light beams. Moreover, when the light source module 200 switches the first light source 210 to a turn-on state and switches the second light source 220 to a turn-off state, the light source module 200 is used for displaying a first pattern, and when the light source module 200 switches the second light source 220 to the turn-on state and switches the first light source 210 to the turn-off state, the light source module 200 is used for displaying a second pattern.

To be specific, referring to FIG. 1 and FIG. 2, in the embodiment, the light guide plate 100 includes a plate body 130, a plurality of first microstructures 110 and a plurality of second microstructures 120. The plate body 130 has a first light incident surface SI1, a second light incident surface SI2 and a first surface S1, where the first light incident surface SI1 is adjacent to the second light incident surface SI2, and the first surface S1 connects the first light incident surface SI1 and the second light incident surface SI2. To be specific, referring to FIG. 1 to FIG. 2, in the embodiment, the first microstructures 110 extend along a first direction D1, the second microstructures 120 extend along a second direction D2, and a normal direction of the plate body 130 is defined as a third direction D3, and the first microstructures 110 and the second microstructures 120 are all located on the first surface S1. For example, in the embodiment, the first surface S1 is, for example, a lower surface of the plate body 130. Namely, as shown in FIG. 2, in the embodiment, the first microstructures 110 and the second microstructures 120 are all located on the lower surface of the plate body 130, though the invention is not limited thereto. In other embodiments, the first surface S1 may also be an upper surface of the plate body 130, i.e. the first microstructures 110 and the second microstructures 120 may also be located on the upper surface of the plate body 130.

Figure 3A:
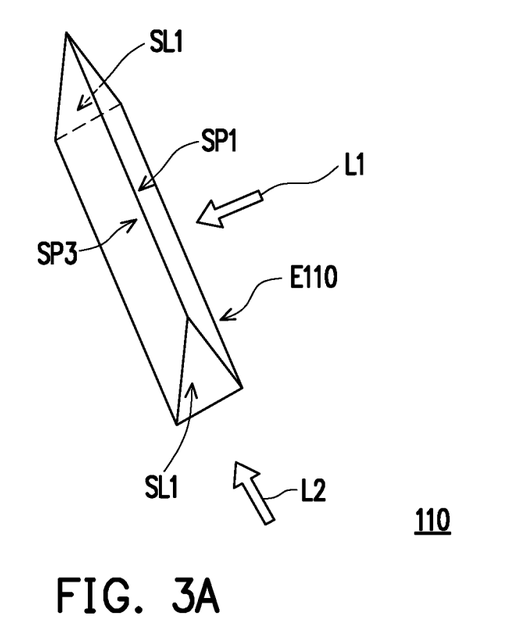
FIG. 3A is a three-dimensional view of an optical path of light incident to a first microstructure of FIG. 2.
Figure 3B:
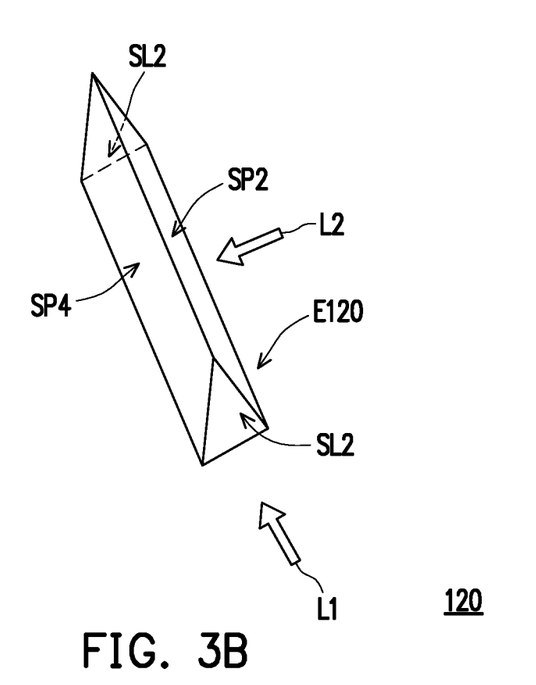
FIG. 3B is a three-dimensional view of an optical path of light incident to a second microstructure of FIG. 2.

Further, FIG. 3A is a three-dimensional view of an optical path of light incident to the first microstructure 110 of FIG. 2. FIG. 3B is a three-dimensional view of an optical path of light incident to the second microstructure 120 of FIG. 2. Referring to FIG. 2, FIG. 3A and FIG. 3B, in the embodiment, the second direction D2 is substantially perpendicular to the first direction D1, i.e. an extending direction of the first microstructures 110 is substantially perpendicular to an extending direction of the second microstructures 120. To be specific, as shown in FIG. 2 and FIG. 3A, in the embodiment, each of the first microstructures 110 has a first optical surface SP1, where the first optical surface SP1 faces the first light incident surface SI1. Moreover, as shown in FIG. 1 and FIG. 2, the first light source 210 is located beside the first light incident surface SI1 of the light guide plate 100, and when the light source module 200 switches the first light source 210 to the turn-on state, the first light source 210 provides a first light beam L1, and the first light beam L1 may enter the light guide plate 100 through the first light incident surface SI1. As shown in FIG. 2 and FIG. 3A, in the embodiment, after the first light beam L1 enters the light guide plate 100 through the first light incident surface SI1, the first light beam L1 may be reflected by the first optical surface SP1 of each of the first microstructures 110 to emit out. In this way, the light source module 200 may display the first pattern required by the lighting effect through an arrangement of the first microstructures 110.

Similarly, as shown in FIG. 2 and FIG. 3B, in the embodiment, each of the second microstructures 120 has a second optical surface SP2, where the second optical surface SP2 faces the second light incident surface SI2. Moreover, as shown in FIG. 1 and FIG. 2, the second light source 220 is located beside the second light incident surface SI2 of the light guide plate 100, where the second light source 220 is used for providing the second light beam L2, and the second light beam L2 may enter the light guide plate 100 through the second light incident surface SI2. As shown in FIG. 2 and FIG. 3B, in the embodiment, after the second light beam L2 enters the light guide plate 100 through the second light incident surface SI2, the second light beam L2 may be reflected by the second optical surface SP2 of each of the second microstructures 120 to emit out. In this way, the light source module 200 may display the second pattern required by the lighting effect through an arrangement of the second microstructures 120.

Further, as shown in FIG. 3A, in the embodiment, each of the first microstructures 110 further has a third optical surface SP3, and two sides of each of the first microstructures 110 respectively have a first edge portion E110, wherein one of the first edge portions E110 faces the second light incident surface SI2, and is inclined relative to the second light incident surface SI2, and there is a first included angle $\theta 1$ between the first edge portion E110 facing the second light incident surface SI2 and the first surface S1. To be specific, since one of the first edge portions E110 of each of the first microstructures 110 faces the second light incident surface SI2, when the light source module 200 switches the second light source 220 to the turn-on state, a part of the second light beam L2 is incident to one of the first edge portions E110 of the first microstructure 110.

Figure 3C:
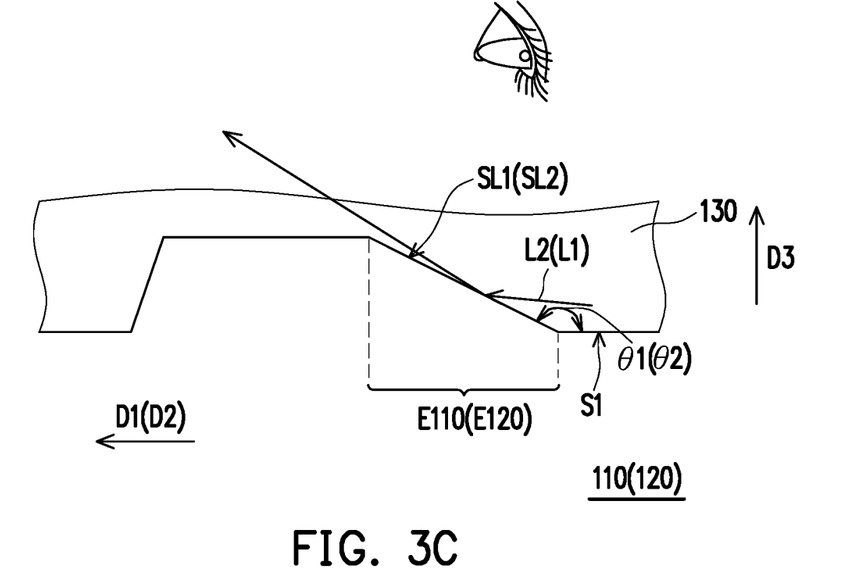
FIG. 3C is a side view of an optical path of light incident to one kind of the first microstructure or the second microstructure of FIG. 2.
Figure 3D:
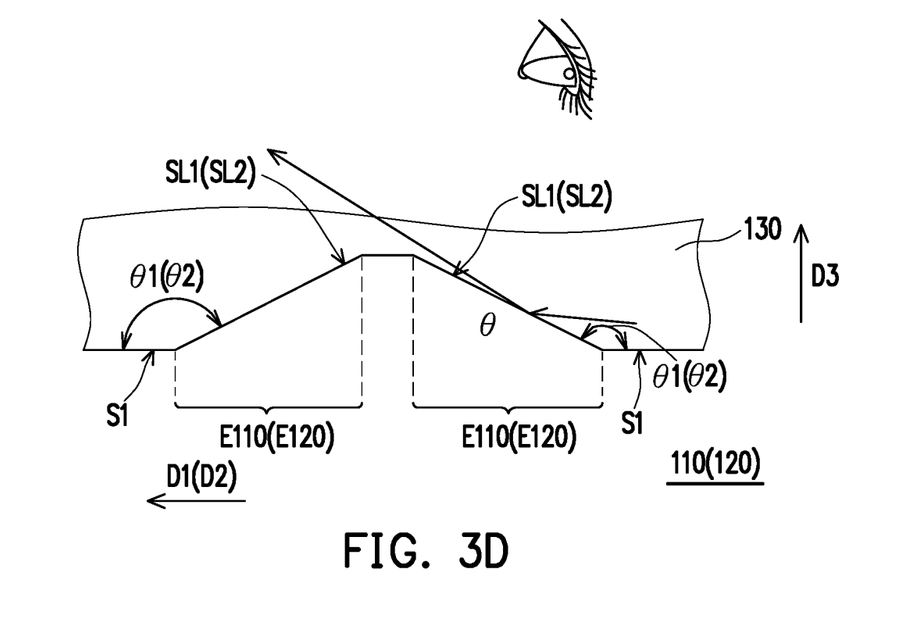
FIG. 3D is a side view of an optical path of light incident to another kind of the first microstructure or the second microstructure of FIG. 2.

FIG. 3C is a side view of an optical path of light incident to one kind of the first microstructure 110 or the second microstructure 120 of FIG. 2, and FIG. 3D is a side view of an optical path of light incident to another kind of the first microstructure 110 or the second microstructure 120 of FIG. 2. It should be noted that although the extending directions of the first microstructures 110 and the second microstructures 120 disposed on the first surface S1 are different, regarding a single first microstructure 110 and a single second microstructure 120, limitation ranges in structural design may be regarded as the same, so that in order to avoid lengthy description, in FIGS. 3C and 3D, the first microstructure 110 and the second microstructure 120 are integrated into the same figures for description. Moreover, when the first microstructure 110 is described, FIGS. 3C and 3D may be regarded as cross-sections of the first microstructure 110 cut along the first direction D1 of FIG. 2, and when the second microstructure 120 is described, FIGS. 3C and 3D may be regarded as cross-sections of the second microstructure 120 cut along the second direction D2 of FIG. 2. To be specific, referring to FIG. 3A and FIG. 3C, in the embodiment, the first edge portion E110 of each of the first microstructures 110 is a first side optical surface SL1, i.e. as shown in FIG. 3A, each of the first microstructures 110 is a prism type microstructure. Referring to FIG. 2, FIG. 3A and FIG. 3C, the first side optical surface SL1 is connected to the first optical surface SP1, the third optical surface SP2 and the first surface S1, and is inclined relative to the second light incident surface SI2, and the first included angle $\theta 1$ is an included angle between the first side optical surface SL1 and the first surface S1. For example, in the embodiment, when each of the first microstructures 110 is recessed into the first surface S1, the first included angle $\theta 1$ is greater than or equal to 140 degrees and smaller than or equal to 179 degrees.

Therefore, referring to FIG. 2 and FIG. 3C, since an inclined surface (i.e. the first side optical surface SL1) between the first surface S1 and the first edge portion E110 of each of the first microstructures 110 inclined relative to the second light incident surface SI2 is relatively low and flat, a reflected angle of the second light beam L2 incident to the first edge portion E110 of the first microstructure 110 is relatively large to deviate the second light beam L2 from the viewing angle of the viewer. Therefore, when the light source module 200 provides the second light beam L2 to display the second pattern required by the lighting effect, the second light beams L2 incident to the first edge portion E110 of the first microstructure 110 do not simultaneously present the first pattern in the viewer's eyes, so that the crosstalk phenomenon between different optical patterns is mitigated.

On the other hand, similarly, in the embodiment, each of the second microstructures 120 is also a prism type microstructure, which has a structural design similar to that of the first microstructure 110. To be specific, referring to FIG. 2, FIG. 3B and FIG. 3C, in the embodiment, each of the second microstructures 120 further has a fourth optical surface SP4, and two sides of each of the second microstructures 120 respectively have a second edge portion E120, wherein one of the second edge portions E120 faces the first light incident surface SI1, and is inclined relative to the first light incident surface SI1, and there is a second included angle $\theta 2$ between the second edge portion E120 facing the first light incident surface SI1 and the first surface S1. To be specific, since one of the second edge portions E120 of each of the second microstructures 120 faces the first light incident surface SI1, when the light source module 200 switches the first light source 210 to the turn-on state, a part of the first light beam L1 is incident to one of the second edge portions E120 of the second microstructure 120.

To be specific, referring to FIG. 2, FIG. 3A and FIG. 3C, in the embodiment, the second edge portion E120 of each of the second microstructures 120 is a second side optical surface SL2, and the second side optical surface SL2 is connected to the second optical surface SP2, the fourth optical surface SP4 and the first surface S1, and is inclined relative to the second light incident surface SI1, and the second included angle $\theta 2$ is an included angle between the second side optical surface SL2 and the first surface S1. For example, in the embodiment, when each of the second microstructures 120 is recessed into the first surface S1, the second included angle $\theta 2$ is greater than or equal to 140 degrees and smaller than or equal to 179 degrees.

Therefore, referring to FIG. 2 and FIG. 3C, since an inclined surface (i.e. the second side optical surface SL2) between the first surface S1 and the second edge portion E120 of each of the second microstructures 120 inclined relative to the first light incident surface SI1 is relatively low and flat, a reflected angle of the first light beam L1 incident to the second edge portion E120 of the second microstructure 120 is relatively large to deviate the first light beam L1 from the viewing angle of the viewer. Therefore, when the light source module 200 provides the first light beam L1 to display the first pattern required by the lighting effect, the first light beams L1 incident to the second edge portion E120 of the second microstructure 120 do not simultaneously present the second pattern in the viewer's eyes, so that the crosstalk phenomenon between different optical patterns is mitigated.

Moreover, although only one of the first edge portions E110 and one of the second edge portions E120 of the aforementioned first microstructure 110 and the second microstructure 120 have the relatively low and flat inclined surface structure, the invention is not limited thereto. As shown in FIG. 3D, in the embodiment of FIG. 3D, the first edge portions E110 of both sides and the second edge portions E120 of both sides of the first microstructure 110 and the second microstructure 120 may all have the relatively low and flat inclined surface structure, and the functions and effects of the aforementioned first microstructure 110 and the second microstructure 120 may still be achieved.

Moreover, it should be noted that in the aforementioned embodiment, the first microstructures 110 and the second microstructures 120 are all recessed relative to the lower surface of the plate body 130, though the invention is not limited thereto, and in other embodiments, the first microstructures 110 and the second microstructures 120 may also be protruded relative to the surface of the plate body 130 as long as the first optical surfaces SP1 of the first microstructures 110 and the second optical surfaces SP2 of the second microstructures 120 respectively face the first light incident surface SI1 and the second light incident surface SI2, and may be used for displaying the first pattern or the second pattern required by the lighting effect. Moreover, in the embodiment, the crosstalk phenomenon between different optical patterns may also be mitigated through a design of an inclining angle of the first edge portion E110 or the second edge portion E120. Further description is made below with reference of FIG. 3E and FIG. 3F.

Figure 3E:
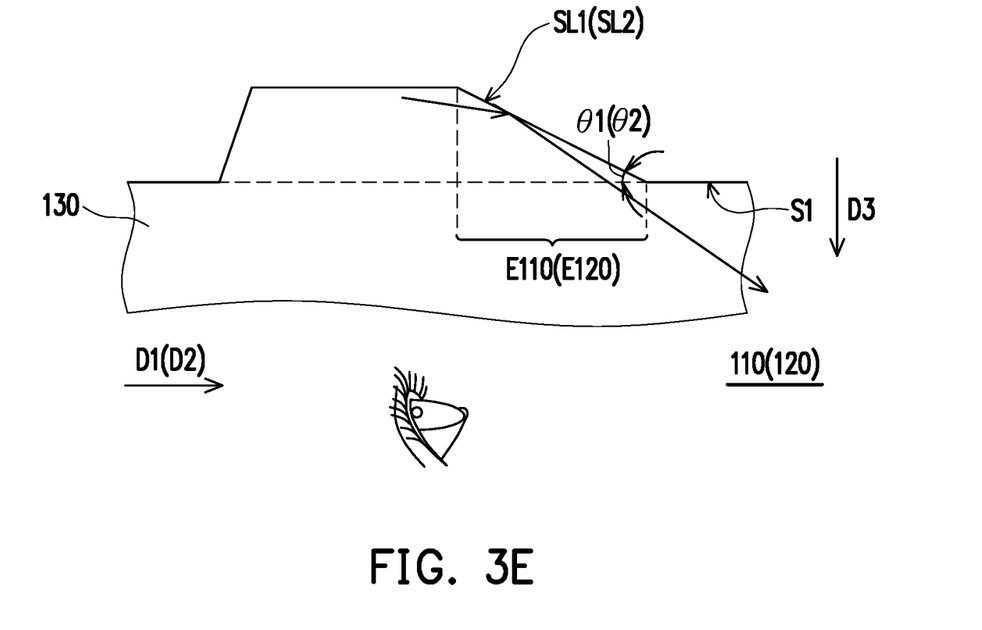
FIG. 3E and FIG. 3F are side views of optical paths of light incident to another kind of the first microstructure or the second microstructure.
Figure 3F:
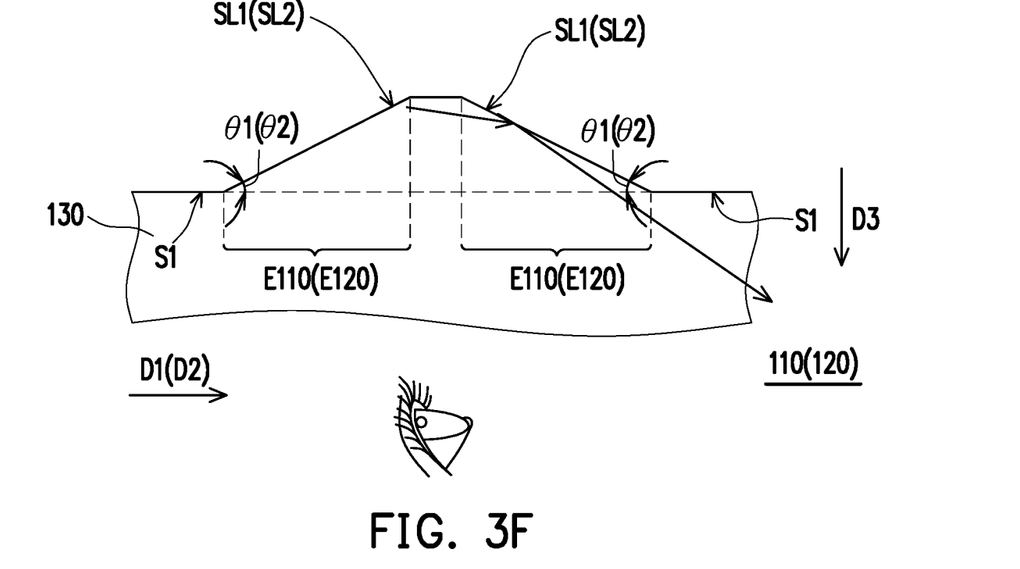

FIG. 3E and FIG. 3F are side views of optical paths of light incident to another kind of the first microstructure 110 or the second microstructure 120. It should be noted that for simplicity's sake, in FIG. 3E and FIG. 3F, the first microstructure 110 and the second microstructure 120 are integrated into the same figure for description. Moreover, when the first microstructure 110 is described, FIG. 3E and FIG. 3F may be regarded as cross-sections of the first microstructure 110 cut along the first direction D1 of FIG. 2, and when the second microstructure 120 is described, FIG. 3E and FIG. 3F may be regarded as cross-sections of the second microstructure 120 cut along the second direction D2 of FIG. 2. Referring to FIG. 3E and FIG. 3F, the first microstructures 110 and the second microstructures 120 of the embodiment are respectively similar to the first microstructures 110 and the second microstructures 120 of FIG. 3C and FIG. 3D, and differences there between are as follows. In the embodiment of FIG. 3E and FIG. 3F, each of the first microstructures 110 and each of the second microstructures 120 are protruded out from the first surface S1, and the first included angle θ1 or the second included angle θ2 is greater than or equal to 1 degree and smaller than or equal to 40 degrees. Therefore, as shown in FIG. 3E and FIG. 3F, since the inclined surfaces (i.e. the first side optical surface SL1 and the second side optical surface SL2) between the first surface S1 and the first edge portion E110 of each of the first microstructures 110 and the second edge portion E120 of each of the second microstructures 120 are relatively low and flat, a reflected angle of the light beam incident to the first edge portion E110 of each of the first microstructures 110 and the second edge portion E120 of each of the second microstructures 120 is relatively large to deviate the light beam from the viewing angle of the viewer. Therefore, when the light source module 200 provides the first light beam L1 or the second light beam L2 to display the first pattern or the second pattern required by the lighting effect, the light beams that are not applied to the main optical surfaces used for presenting the pattern effects do not present patterns in the viewer's eyes, so that the crosstalk phenomenon between different optical patterns is mitigated.

In this way, in the light source module 200 and the light guide plate 100, by configuring the first edge portions E110 of the first microstructures 110 or the second edge portions E120 of the second microstructures 120, the light beams that are not applied to the main optical surfaces used for presenting the pattern effects may be deviated from the viewing angle of the viewer, so as to reduce the crosstalk phenomenon between different optical patterns. In this way, the light source module 200 of the invention may clearly switch and display different optical patterns.

Figure 4:
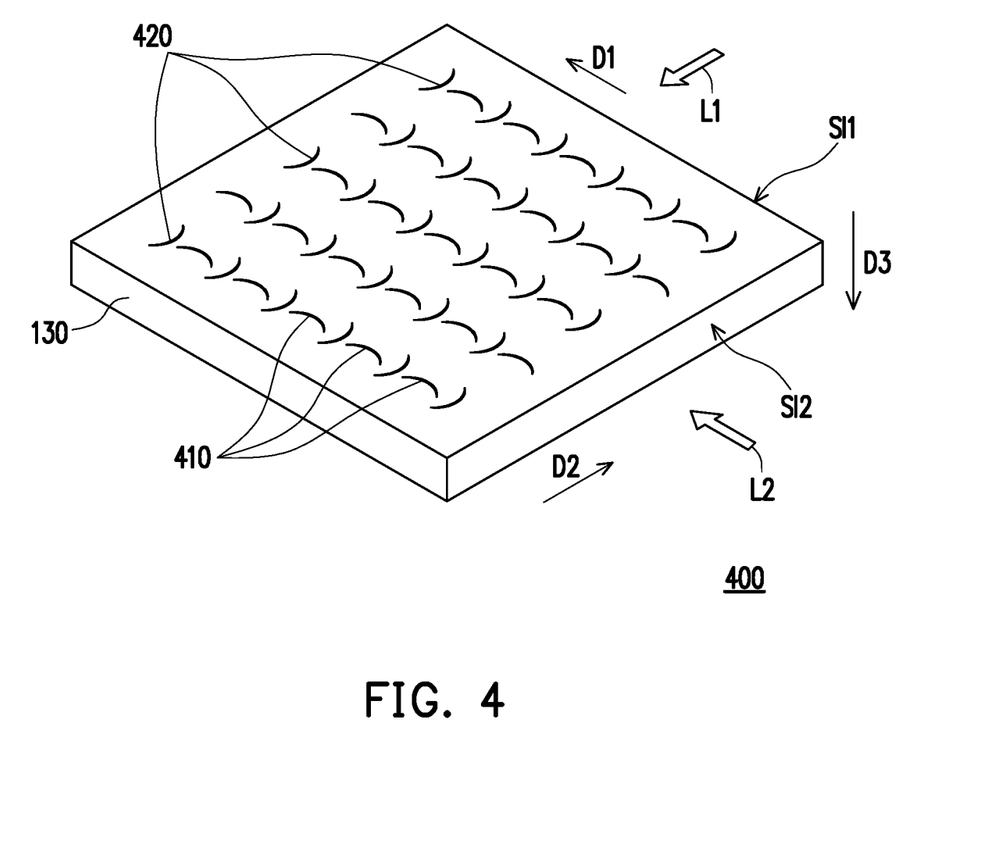
FIG. 4 is a bottom view of another kind of light guide plate of FIG. 1.
Figure 5A:
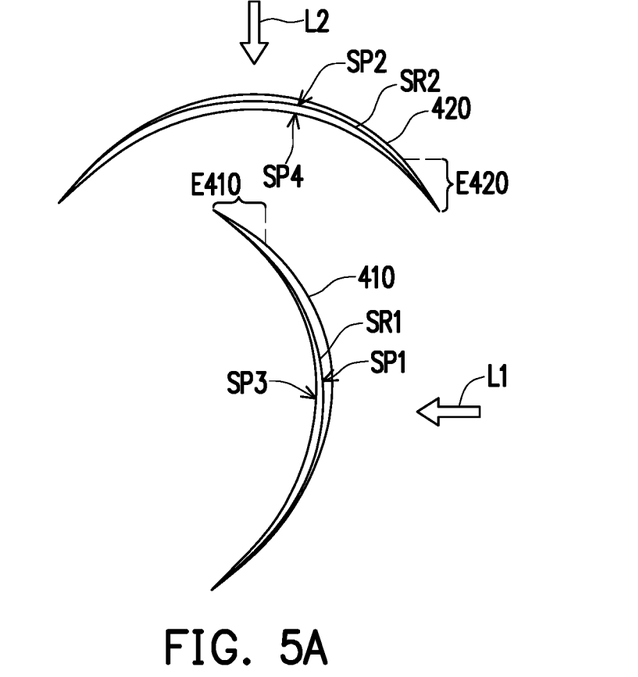
FIG. 5A is a three-dimensional view of an optical path of light incident to the first microstructure and the second microstructure of FIG. 4.
Figure 5B:
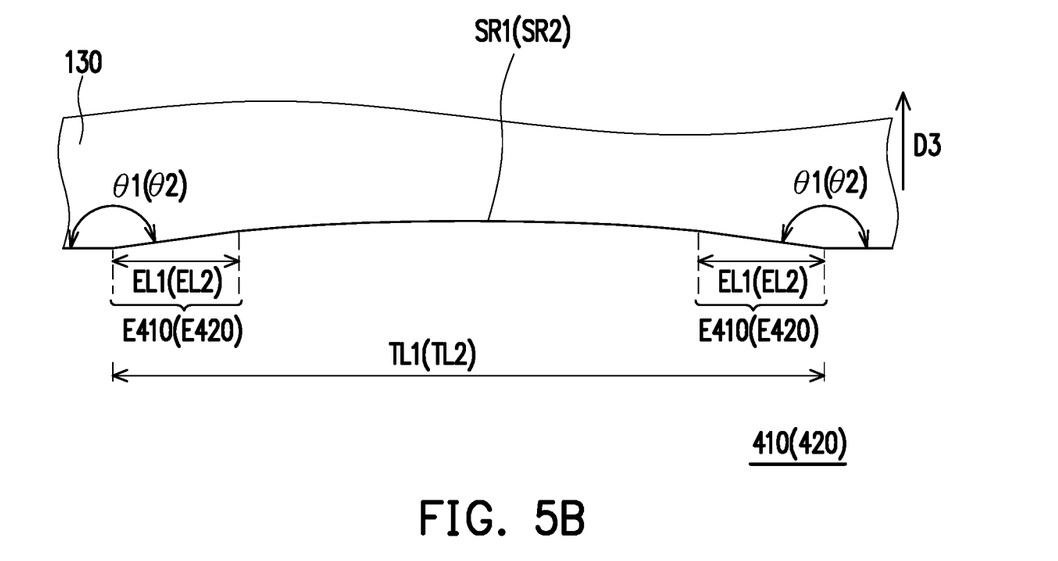

FIG. 4 is a bottom view of another kind of light guide plate of FIG. 1. FIG. 5A is a three-dimensional view of an optical path of light incident to the first microstructure and the second microstructure of FIG. 4. FIG. 5B is a side view of a first microstructure 410 or a second microstructure 420 of FIG. 4. It should be noted that although extending directions of the first microstructure 410 and the second microstructure 420 disposed on the first surface S1 of the plate body 130 are different, regarding a single first microstructure 410 and a single second microstructure 420, limitation ranges in structural design may be regarded as the same, so that in order to avoid lengthy description, in FIG. 5B, the first microstructure 410 and the second microstructure 420 are integrated into the same figure for description. Referring to FIG. 4, in the embodiment, the light guide plate 400 is similar to the light guide plate 100 of FIG. 2, and differences there between are as follows. As shown in FIG. 5 to FIG. 5B, in the embodiment, the first microstructures 410 and the second microstructures 420 of the light guide plate 400 are crescent structures. Namely, the first microstructures 410 and the second microstructures 420 of the embodiment do not have the first side optical surface SL1 and the second side optical surface SL2, but respectively have a first ridge line SR1 and a second ridge line SR2. Moreover, when the first microstructure 410 is described, FIG. 5B may be regarded as a cross-section of the first microstructure 410 cut along the first ridge line SR1 of FIG. 5A, and when the second microstructure 420 is described, FIG. 5B may be regarded as a cross-section of the second microstructure 420 cut along the second ridge line SR2 of FIG. 5A.

To be more specific, as shown in FIG. 5A, in the embodiment, the first optical surface SP1 and the third optical surface SP3 of each of the first microstructures 410 are connected with each other to form the first ridge line SR1, and similarly, the second optical surface SP2 and the fourth optical surface SP4 of each of the second microstructures 420 are connected with each other to form the second ridge line SR2. As shown in FIG. 5A, in the embodiment, the first ridge line SR1 and the second ridge line SR2 are all arc lines, and the first ridge line SR1 and the second ridge line SR2 are respectively convex toward the first light beam L1 and the second light beam L2. Moreover, as shown in FIG. 4 and FIG. 5A, in the embodiment, the first edge portion E410 facing the second light incident surface SI2 is located on the first optical surface SP1, and the second edge portion E420 facing the first light incident surface SI1 is located on the second optical surface SP2.

Moreover, to be specific, as show in FIG. 4, FIG. 5A and FIG. 5B, in the embodiment, the first included angle θ1 is an included angle between the first surface S1 and the first ridge line SR1 in the first edge portion E410 facing the second light incident surface SI2, and the second included angle θ2 is an included angle between the first surface S1 and the second ridge line SR2 the second edge portion E420 facing the first light incident surface SI1. For example, in the embodiment, when each of the first microstructures 410 and each of the second microstructures 420 are recessed into the first surface S1, the first included angle θ1 and the second included angle θ2 are greater than or equal to 140 degrees and smaller than or equal to 179 degrees.

Therefore, as shown in FIG. 5A and FIG. 5B, since inclined surfaces (i.e. the first optical surface SP1 in the first edge portion E410 facing the second light incident surface SI2 and the second optical surface SP2 in the second edge portion E420 facing the first light incident surface SI1) between the first surface S1 and the first edge portion E410 of each of the first microstructures 410 and the second edge portion E420 of each of the second microstructures 420 are relatively low and flat, a reflected angle of the light beam incident to the first edge portion E410 of each of the first microstructures 410 and the second edge portion E420 of each of the second microstructures 420 is relatively large to deviate the light beam from the viewing angle of the viewer. Therefore, when the light source module 200 provides the first light beam L1 or the second light beam L2 to display the first pattern or the second pattern required by the lighting effect, the light beams that are not applied to the main optical surfaces used for presenting the pattern effects do not present patterns in the viewer's eyes, so that the crosstalk phenomenon between different optical patterns is mitigated. Therefore, the light source module 200 adopting the light guide plate 400 may also clearly switch and display different optical patterns.

For example, in the embodiment, a ratio between a length EL1 of one of the first edge portions E410 and a length TL1 of the first microstructure 410 ranges between 5% and 50%, and in the embodiment, a ratio between a length EL2 of one of the second edge portions E420 and a length TL2 of the second microstructure 420 ranges between 5% and 50%. To be more specific, as shown in FIG. 5B, in the embodiment, an edge of the first ridge line SR1 and an edge of the second ridge line SR2 are only partially flattened, so that the ratio between the length EL1 of one of the first edge portions E410 and the length TL1 of the first microstructure 410 ranges between 5% and 10%, and the ratio between the length EL2 of one of the second edge portions E420 and the length TL2 of the second microstructure 420 ranges between 5% and 10%, though the invention is not limited thereto. Two other embodiments are provided below for further description.

Figure 6A:
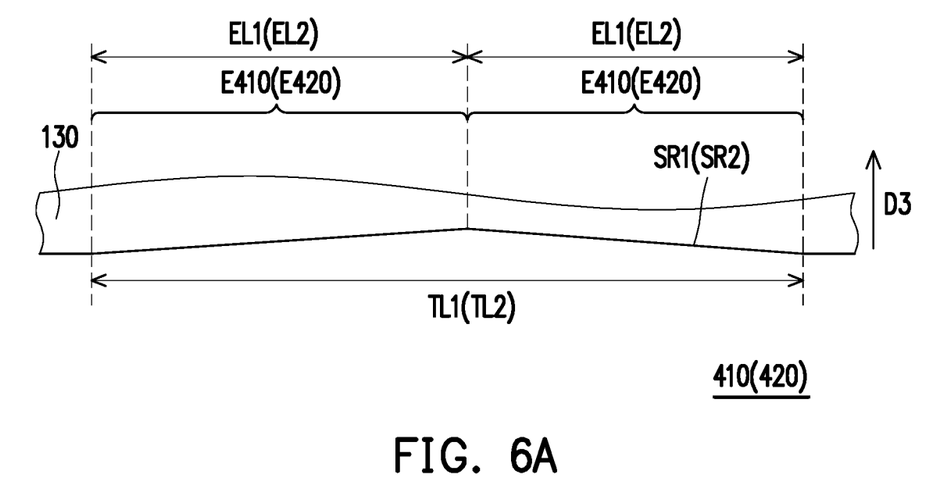
Figure 6B:
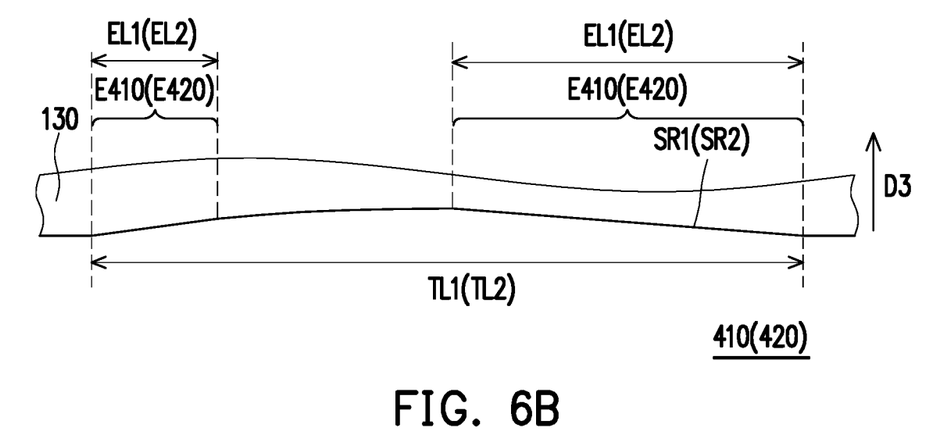

FIG. 6A to FIG. 6B are side views of a different first microstructure 410 or second microstructure 420 of FIG. 4. It should be noted that in order to avoid lengthy description, in FIGS. 6A and 6B, the first microstructure 410 and the second microstructure 420 are integrated into the same figures for description. Moreover, when the first microstructure 410 is described, FIGS. 6A and 6B may be regarded as cross-sections of the first microstructure 410 cut along the first ridge line SR1 of FIG. 5A, and when the second microstructure 120 is described, FIGS. 6A and 6B may be regarded as cross-sections of the second microstructure 420 cut along the second ridge line SR2 of FIG. 5A. As shown in FIG. 6A, in the embodiment of FIG. 6A, in the first microstructure 410 (the second microstructure 420), the first ridge line SR1 (the second ridge line SR2) may be flattened from a center to the two edges, so as to form an inclined surface structure with a constant slope. In the embodiment, the ratio between the length EL1 of one of the first edge portions E410 and the length TL1 of the first microstructure 410 is about 50%, and the ratio between the length EL2 of one of the second edge portions E420 and the length TL2 of the second microstructure 420 is also about 50%. Therefore, in the embodiment of FIG. 6A, since inclined surfaces (i.e. the first optical surface SP1 in the first edge portion E410 facing the second light incident surface SI2 and the second optical surface SP2 in the second edge portion E420 facing the first light incident surface SI1) between the first surface S1 and the first edge portion E410 of each of the first microstructures 410 and the second edge portion E420 of each of the second microstructures 420 are also relatively low and flat, when the first microstructures 410 and the second microstructures 420 are applied to the light guide plate 400 of FIG. 4, the functions and effects of the aforementioned first microstructures 410 and the second microstructures 420 may still be achieved, and other related details are not repeated.

On the other hand, as shown in FIG. 6B, in the embodiment of FIG. 6B, in the first microstructure 410 (the second microstructure 420), the first ridge line SR1 (the second ridge line SR2) may be flattened from the center to the one of the edges to form an inclined surface structure with a constant slope, and in the first microstructure 410 (the second microstructure 420), the first ridge line SR1 (the second ridge line SR2) may be partially flattened from the center to the other one of the edges. Namely, in the embodiment, the ratio between the length EL1 of one of the first edge portions E410 and the length TL1 of the first microstructure 410 is about 50%, and the ratio between the length EL1 of the other one of the first edge portions E410 and the length TL1 of the first microstructure 410 is ranges between 5% and 10%. Similarly, the ratio between the length EL2 of one of the second edge portions E420 and the length TL2 of the second microstructure 420 is also about 50%, and the ratio between the length EL2 of the other one of the second edge portions E420 and the length TL2 of the second microstructure 420 is ranges between 5% and 10%. Therefore, in the embodiment of FIG. 6B, since inclined surfaces (i.e. the first optical surface SP1 in the first edge portion E410 facing the second light incident surface SI2 and the second optical surface SP2 in the second edge portion E420 facing the first light incident surface SI1) between the first surface S1 and the first edge portion E410 of each of the first microstructures 410 and the second edge portion E420 of each of the second microstructures 420 are also relatively low and flat, when the first microstructures 410 and the second microstructures 420 are applied to the light guide plate 400 of FIG. 4, the functions and effects of the aforementioned first microstructures 410 and the second microstructures 420 may still be achieved, and other related details are not repeated.

Figure 7A:
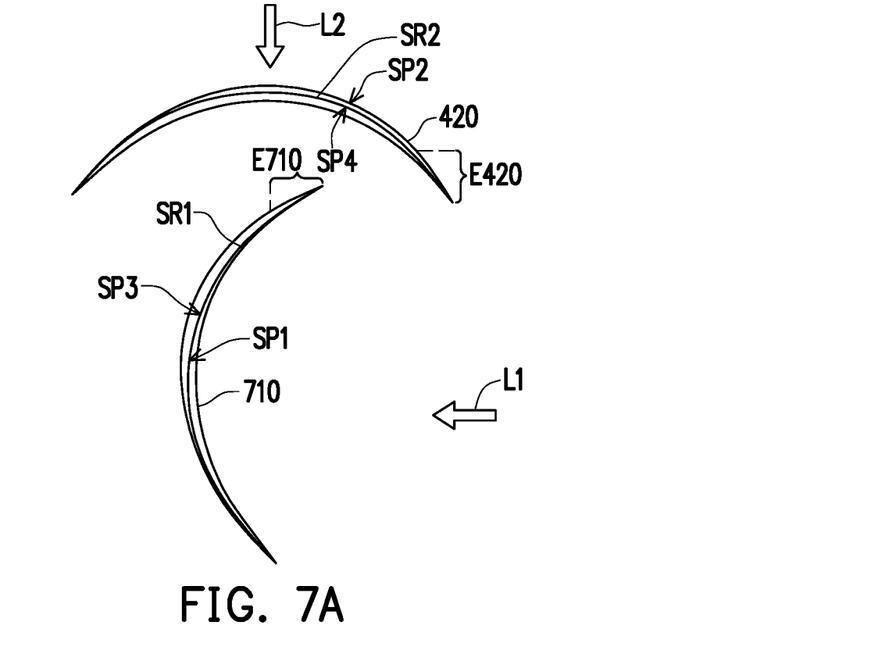
FIG. 7A to FIG. 7C are side views of light incident to the first microstructures and the second microstructures with different arrangements.
Figure 7B:
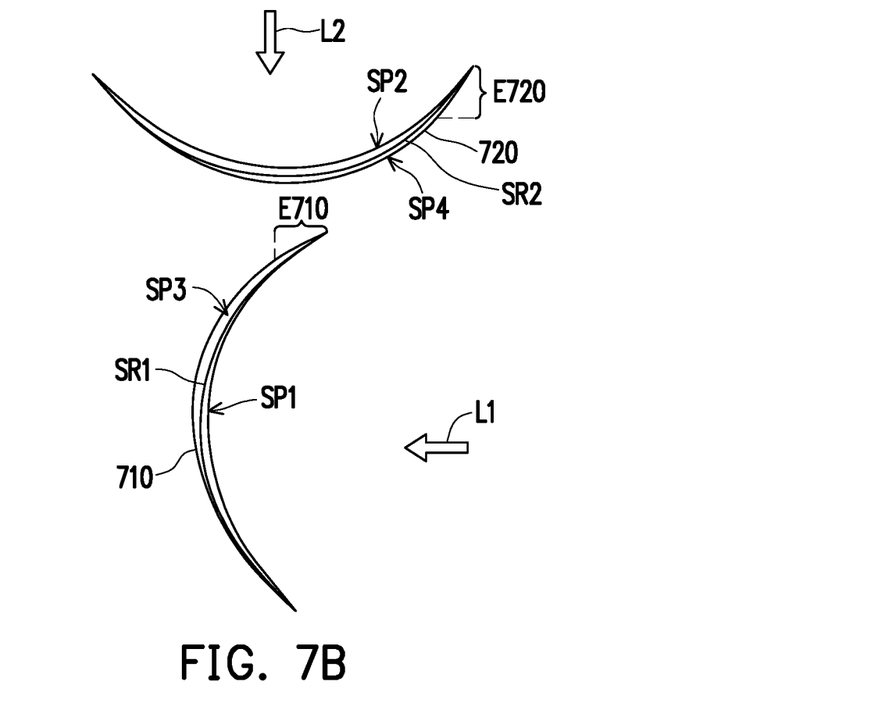
Figure 7C:
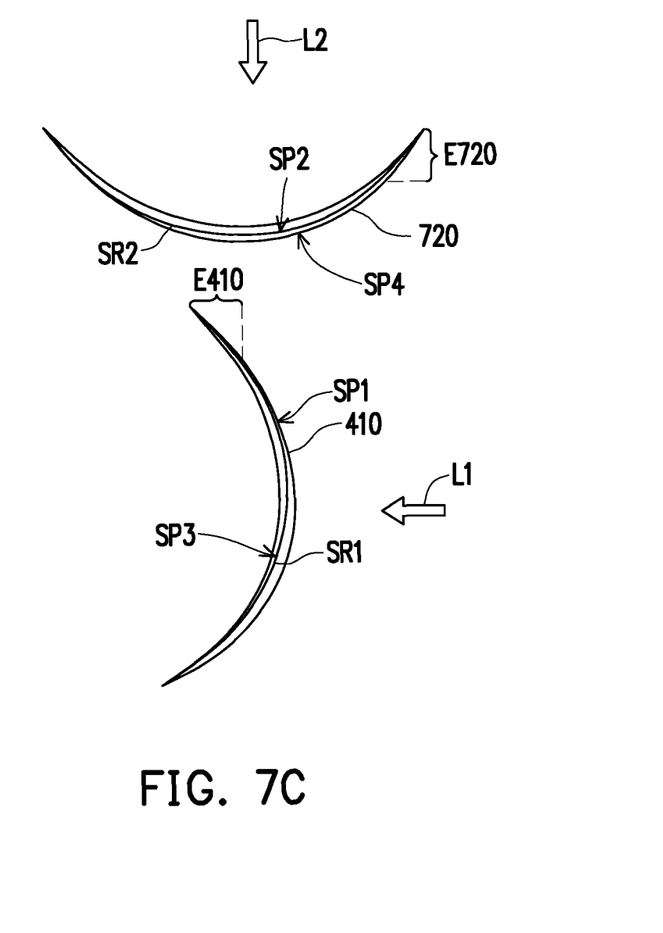

FIG. 7A to FIG. 7C are side views of light incident to the first microstructures and the second microstructures with different arrangements. Referring to FIG. 5A and FIG. 7A to FIG. 7C, the first microstructure 710 of FIG. 7A and FIG. 7B is similar to the first microstructure 410 of FIG. 5A, and the second microstructure 720 of FIG. 7B and FIG. 7C is similar to the second microstructure 420 of FIG. 5A, and differences there between are as follows.

For example, as shown in FIG. 7A, in the embodiment of FIG. 7A, the first ridge line SR1 of the first microstructure 710 is concave toward the first light beam L1, so that the first edge portion E710 facing the second light incident surface SI2 is located on the third optical surface SP3, and the second ridge line SR2 of the second microstructure 420 is convex toward the second light beam L2, so that the second edge portion E420 facing the first light incident surface SI1 is located on the second optical surface SP2.

As shown in FIG. 7B, in the embodiment of FIG. 7B, the first ridge line SR1 of the first microstructure 710 is concave toward the first light beam L1, so that the first edge portion E710 facing the second light incident surface SI2 is located on the third optical surface SP3, and the second ridge line SR2 of the second microstructure 720 is concave toward the second light beam L2, so that the second edge portion E720 facing the first light incident surface SI1 is located on the fourth optical surface SP4.

As shown in FIG. 7C, in the embodiment of FIG. 7C, the first ridge line SR1 of the first microstructure 410 is convex toward the first light beam L1, so that the first edge portion E410 facing the second light incident surface SI2 is located on the first optical surface SP1, and the second ridge line SR2 of the second microstructure 720 is concave toward the second light beam L2, so that the second edge portion E720 facing the first light incident surface SI1 is located on the fourth optical surface SP4.

Namely, in the aforementioned embodiment, the first ridge line SR1 of the first microstructures 410 and 710 and the second ridge line SR2 of the second microstructures 420 and 720 are not limited to be convex toward or concave toward the first light beam L1 and the second light beam L2, as long as the inclined surfaces between the first surface S1 and the first edge portions E410, E710 facing the second light incident surface SI2 and the second edge portions E420, E720 facing the first light incident surface SI1 are relatively low and flat to make the reflected angles of the light beams incident to the first edge portions E410, E710 of each of the first microstructures 110 and the second edge portions E420, E720 of each of the second microstructures 120 to be larger to deviate the light beams from the viewing angle of the viewer. Therefore, when the first microstructures 710 and the second microstructures 720 of the aforementioned embodiment are applied to the light guide plate 400 of FIG. 4, the functions and effects of the aforementioned first microstructures 410 and the second microstructures 420 may still be achieved, and other related details are not repeated.

Moreover, it should be noted that in the aforementioned embodiment, the first microstructures 410, 710 and the second microstructures 420, 720 are all recessed relative to the lower surface of the plate body 130, though the invention is not limited thereto, and in other embodiments, each of the first microstructures 410, 720 and each of the second microstructures 420, 720 may also be protruded out from the first surface S1 to form structures similar to that of FIG. 3E and FIG. 3F, and the first included angle θ1 or the second included angle θ1 are greater than or equal to 1 degree and smaller than or equal to 40 degrees. Moreover, when each of the first microstructures 410, 710 and each of second microstructures 420, 720 are applied to the light guide plate 400 of FIG. 4, the functions and effects of the aforementioned first microstructures 410, 710 and the second microstructures 420, 720 of FIG. 5A to FIG. 7C may still be achieved, and other related details are not repeated.

In summary, the embodiments of the invention have at least one of following advantages or effect. In the embodiment of the invention, the light source module and the light guide plate of the invention are adapted to deviate the light beam that is not applied to the main optical surface used for presenting the pattern effect from the viewing angle of the viewer based on the configuration of the first edge portions of the first microstructures or the second edge portions of the second microstructures, so as to reduce the crosstalk phenomenon of different optical patterns. In this way, the light source module of the invention is capable of clearly switching and displaying different optical patterns.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light guide plate, comprising:
a plate body, having a first light incident surface, a second light incident surface and a first surface, wherein the first light incident surface is adjacent to the second light incident surface, and the first surface connects the first light incident surface and the second light incident surface;
a plurality of first microstructures, located on the first surface, wherein each of the first microstructures has a first optical surface, and the first optical surface faces the first light incident surface, and two sides of each of the first microstructures respectively have a first edge portion, one of the first edge portions faces the second light incident surface and is inclined relative to the second light incident surface, and there is a first included angle between the first edge portion facing the second light incident surface and the first surface; and a plurality of second microstructures, located on the first surface, wherein each of the second microstructures has a second optical surface, and the second optical surface faces the second light incident surface.

2. The light guide plate as claimed in claim 1, wherein two sides of each of the second microstructures respectively have a second edge portion, one of the second edge portions faces the first light incident surface and is inclined relative to the first light incident surface, and there is a second included angle between the second edge portion facing the first light incident surface and the first surface.

3. The light guide plate as claimed in claim 2, wherein each of the first microstructures and each of the second microstructures are recessed into the first surface, and the first included angle or the second included angle is greater than or equal to 140 degrees and smaller than or equal to 179 degrees.

4. The light guide plate as claimed in claim 2, wherein each of the first microstructures and each of the second microstructures are protruded out from the first surface, and the first included angle or the second included angle is greater than or equal to 1 degree and smaller than or equal to 40 degrees.

5. The light guide plate as claimed in claim 2, wherein each of the first microstructures further has a third optical surface, the first optical surface and the third optical surface of each of the first microstructures are connected to each other to form a first ridge line, the first ridge line is an arc line, and the first edge portion facing the second light incident surface is located on the first optical surface or the third optical surface.

6. The light guide plate as claimed in claim 5, wherein each of the second microstructures further has a fourth optical surface, the second optical surface and the fourth optical surface of each of the second microstructures are connected to each other to form a second ridge line, the second ridge line is an arc line, and the second edge portion facing the first light incident surface is located on the second optical surface or the fourth optical surface.

7. The light guide plate as claimed in claim 5, wherein a ratio between a length of the first edge portion and a length of the first microstructure ranges between 5% and 50%.

8. The light guide plate as claimed in claim 6, wherein a ratio between a length of the second edge portion and a length of the second microstructure ranges between 5% and 50%.

9. The light guide plate as claimed in claim 2, wherein each of the first microstructures further has a third optical surface, the first edge portion is a first side optical surface, the first side optical surface connects the first optical surface, the third optical surface and the first surface, the first side optical surface is inclined relative to the second light incident surface, and the first included angle is an included angle between the first side optical surface and the first surface.

10. The light guide plate as claimed in claim 2, wherein each of the second microstructures further has a fourth optical surface, the second edge portion is a second side optical surface, the second side optical surface connects the second optical surface, the fourth optical surface and the first surface, the second side optical surface is inclined relative to the first light incident surface, and the second included angle is an included angle between the second side optical surface and the first surface.

11. A light source module, comprising:
a light guide plate,
a plate body, having a first light incident surface, a second light incident surface and a first surface, wherein the first light incident surface is adjacent to the second light incident surface, and the first surface connects the first light incident surface and the second light incident surface;
a plurality of first microstructures, located on the first surface, wherein each of the first microstructures has a first optical surface, and the first optical surface faces the first light incident surface, and two sides of each of the first microstructures respectively have a first edge portion, one of the first edge portions faces the second light incident surface and is inclined relative to the second light incident surface, and there is a first included angle between the first edge portion facing the second light incident surface and the first surface; and
a plurality of second microstructures, located on the first surface, wherein each of the second microstructures has a second optical surface, and the second optical surface faces the second light incident surface;
a first light source, located beside the first light incident surface of the light guide plate, wherein the first light source is configured to provide a first light beam, and the first light beam enters the light guide plate through the first light incident surface; and
a second light source, located beside the second light incident surface of the light guide plate, wherein the second light source is configured to provide a second light beam, and the second light beam enters the light guide plate through the second light incident surface.

12. The light source module as claimed in claim 11, wherein two sides of each of the second microstructures respectively have a second edge portion, one of the second edge portions faces the first light incident surface and is inclined relative to the first light incident surface, and there is a second included angle between the second edge portion facing the first light incident surface and the first surface.

13. The light source module as claimed in claim 12, wherein each of the first microstructures and each of the second microstructures are recessed into the first surface, and the first included angle or the second included angle is greater than or equal to 140 degrees and smaller than or equal to 179 degrees.

14. The light source module as claimed in claim 12, wherein each of the first microstructures and each of the second microstructures are protruded out from the first surface, and the first included angle or the second included angle is greater than or equal to 1 degree and smaller than or equal to 40 degrees.

15. The light source module as claimed in claim 12, wherein each of the first microstructures further has a third optical surface, the first optical surface and the third optical surface of each of the first microstructures are connected to each other to form a first ridge line, the first ridge line is an arc line, and the first edge portion facing the second light incident surface is located on the first optical surface or the third optical surface.

16. The light source module as claimed in claim 15, wherein each of the second microstructures further has a fourth optical surface, the second optical surface and the fourth optical surface of each of the second microstructures are connected to each other to form a second ridge line, the second ridge line is an arc line, and the second edge portion facing the first light incident surface is located on the second optical surface or the fourth optical surface.

17. The light source module as claimed in claim 16, wherein a ratio between a length of the second edge portion and a length of the second microstructure ranges between 5% and 50%.

18. The light source module as claimed in claim 15, wherein a ratio between a length of the first edge portion and a length of the first microstructure ranges between 5% and 50%.

19. The light source module as claimed in claim 12, wherein each of the first microstructures further has a third optical surface, the first edge portion is a first side optical surface, the first side optical surface connects the first optical surface, the third optical surface and the first surface, the first side optical surface is inclined relative to the second light incident surface, and the first included angle is an included angle between the first side optical surface and the first surface.

20. The light source module as claimed in claim 12, wherein each of the second microstructures further has a fourth optical surface, the second edge portion is a second side optical surface, the second side optical surface connects the second optical surface, the fourth optical surface and the first surface, the second side optical surface is inclined relative to the first light incident surface, and the second included angle is an included angle between the second side optical surface and the first surface.

* * * * *